(12) United States Patent
Deshmukh et al.

(10) Patent No.: US 8,775,184 B2
(45) Date of Patent: Jul. 8, 2014

(54) EVALUATING SPOKEN SKILLS

(75) Inventors: Om D. Deshmukh, New Delhi (IN);
Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 12/354,849

(22) Filed: Jan. 16, 2009

(65) Prior Publication Data
US 2010/0185435 A1 Jul. 22, 2010

(51) Int. Cl.
*G10L 15/00* (2013.01)
*G10L 15/04* (2013.01)

(52) U.S. Cl.
USPC ............. 704/254; 704/251; 434/185

(58) Field of Classification Search
USPC ............. 704/251, 254; 434/185, 156
See application file for complete search history.

(56) References Cited

U.S. PATENT DOCUMENTS

| | | | | |
|---|---|---|---|---|
| 4,764,966 A | * | 8/1988 | Einkauf et al. | 704/228 |
| 5,574,823 A | * | 11/1996 | Hassanein et al. | 704/208 |
| 5,742,928 A | * | 4/1998 | Suzuki | 704/239 |
| 5,799,276 A | * | 8/1998 | Komissarchik et al. | 704/251 |
| 5,857,173 A | * | 1/1999 | Beard et al. | 704/276 |
| 6,055,498 A | * | 4/2000 | Neumeyer et al. | 704/246 |
| 6,070,140 A | * | 5/2000 | Tran | 704/275 |
| 6,317,712 B1 | * | 11/2001 | Kao et al. | 704/256.3 |
| 6,358,055 B1 | * | 3/2002 | Rothenberg | 434/185 |
| 6,397,185 B1 | * | 5/2002 | Komissarchik et al. | 704/270 |
| 6,963,837 B1 | | 11/2005 | Finke et al. | |
| 7,013,276 B2 | * | 3/2006 | Bickley et al. | 704/255 |
| 7,089,188 B2 | * | 8/2006 | Logan et al. | 704/270 |
| 7,146,319 B2 | | 12/2006 | Hunt | |
| 7,171,357 B2 | * | 1/2007 | Boland | 704/231 |
| 7,219,059 B2 | * | 5/2007 | Gupta et al. | 704/240 |
| 7,292,980 B1 | | 11/2007 | August et al. | |
| 7,778,834 B2 | * | 8/2010 | Higgins et al. | 704/270 |
| 7,966,180 B2 | * | 6/2011 | Bajaj et al. | 704/235 |
| 8,036,893 B2 | * | 10/2011 | Reich | 704/257 |
| 2002/0086268 A1 | | 7/2002 | Shpiro | |
| 2005/0027528 A1 | * | 2/2005 | Yantorno et al. | 704/246 |

FOREIGN PATENT DOCUMENTS

| | | |
|---|---|---|
| JP | 6110494 A | 4/1994 |
| JP | 11143346 A | 5/1999 |
| JP | 2006154212 A | 6/2006 |
| JP | 2006195092 A | 7/2006 |

OTHER PUBLICATIONS

Tepperman et. al., "Robust recognition and assessment of nonnative speech variability," in Proc. of Intl. Conf. on Int. Sys. and Compt.: Theory and Appl., Ayia Napa Cyprus, Jul. 2006.

(Continued)

*Primary Examiner* — Shaun Roberts
(74) *Attorney, Agent, or Firm* — Ryan, Mason & Lewis, LLP

(57) ABSTRACT

Techniques for evaluating one or more spoken language skills of a speaker are provided. The techniques include identifying one or more temporal locations of interest in a speech passage spoken by a speaker, computing one or more acoustic parameters, wherein the one or more acoustic parameters capture one or more properties of one or more acoustic-phonetic features of the one or more locations of interest, and combining the one or more acoustic parameters with an output of an automatic speech recognizer to modify an output of a spoken language skill evaluation.

22 Claims, 4 Drawing Sheets

(56) References Cited

OTHER PUBLICATIONS

Fosler-Lussier, E., "Contextual word and syllable pronunciation models," in IEEE Intl Workshop on ASRU, Keystone Colorado, Dec. 1999.

Franco, et al., "Automatic pronunciation scoring for language instruction," in Proc. of ICASSP, 1997.

Jenkin et al., "Development and comparison of three syllable stress classifiers," in Proc. of Intl. Conf. on Speech and Lang. Proc., Philadelphia, Oct. 1996.

Chandel et. al., "Sensei: Spoken language assessment for call center agents," in IEEE Intl Workshop on ASRU, Kyoto, Japan, Dec. 2007.

Fiscus, J. "A post-processing system to yield reduced word error rates: Recognizer output voting error reduction (rover)," IEEE Intl Workshop on ASRU, Dec. 1997.

Venkataramani et. al., "GiniSupport vector machines for segmental minimum bayes risk decoding of continuous speech," Computer Speech and Language, vol. 21, pp. 423-442, 2007.

Ma et al., "A study on word detector design and knowledge-based pruning and rescoring," in Proc. Interspeech, Antwerp, Aug. 2007.

Momayyez et. al., "Exploiting complementary aspects of phonological features in automatic speech recognition," in IEEE Intl Workshop on ASRU, Kyoto, Japan, Dec. 2007.

Espy-Wilson, C. "Acoustic measures for linguistic features distinguishing the semivowels /wjrl/ in american english," J. of Acoust. Soc. of Am., vol. 96, pp. 65-72, 1992.

Bitar et al., "Knowledge-Based Parameters for HMM Speech Recognition", in Proceedings of the IEEE ICASSP, pp. 29-32, Atlanta, GA, May 1996.

Solomon et. al., "Detection of speech landmarks: Use of temporal information," J. of Acoust. Soc. of Am., vol. 115(3), pp. 1296-1305, 2004.

Seppi, et al., "Word duration modeling for word graph rescoring in LVCSR", Proceedings of Interspeech 2007, pp. 1805-1808.

Hori et al., Open-Vocabulary Spoken Utterance Retrieval Using Confusion Networks. people.csail.mit.edu/hazen/publications/icassp07_hori.pdf, 2007.

* cited by examiner

EVALUATING SPOKEN SKILLS

FIELD OF THE INVENTION

Embodiments of the invention generally relate to information technology, and, more particularly, to speech recognition.

BACKGROUND OF THE INVENTION

Evaluating spoken grammar skills is a primary component of evaluating the overall spoken English skills of a candidate or individual. Also, a jump in the interest to learn and improve spoken English skills coupled with the rising popularity of the Internet has fueled interest in the area of computer assisted language learning (CALL). Most of the existing CALL system approaches focus on evaluation of pronunciation, and/or syllable stress. However, such approaches do not focus on spoken grammar evaluation. Additionally, existing CALL system evaluations are conducted by human assessors, leading to subjectivity, lack-of-scalability, higher costs, etc.

In traditional approaches, to evaluate spoken grammar skills, a candidate is asked to speak on a given topic and a human assessor evaluates the candidate based on the type and the frequency of the grammatical errors committed by the candidate. However, such approaches are difficult in automatic spoken grammar evaluation because the accuracy of the current automatic speech recognition (ASR) systems is relatively low for spontaneous free speech, and the language model (LM), which plays an important role in ASR, significantly reduces the probability of recognizing grammatically incorrect sentences.

In existing automatic approaches, a prompt is played to a candidate that might have a grammatical error in it. The candidate is expected to detect any grammatical mistake and record the corresponding grammatically correct sentence, which can then be decoded by an ASR system with a LM that includes a pre-selected set of sentences. However, such approaches can still result in recognition errors. For example, such an approach makes an error when two (or more) sentences in the LM are acoustically close to each other (for example, "he kill a snake" versus "he killed a snake"). In this case, it is highly likely that a different sentence than the one actually spoken is recognized.

Also, problems can occur in such approaches when a candidate speaks a sentence which is not present in the LM but the ASR recognizes it as one of the sentences present in the LM with a high confidence. This can happen when the spoken sentence is acoustically similar to one of the sentences present in the LM.

SUMMARY OF THE INVENTION

Principles and embodiments of the invention provide techniques for evaluating spoken skills. An exemplary method (which may be computer-implemented) for evaluating one or more spoken language skills of a speaker, according to one aspect of the invention, can include steps of identifying one or more temporal locations of interest in a speech passage spoken by a speaker, computing one or more acoustic parameters, wherein the one or more acoustic parameters capture one or more properties of one or more acoustic-phonetic features of the one or more locations of interest, and combining the one or more acoustic parameters with an output of an automatic speech recognizer to modify an output of a spoken language skill evaluation.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
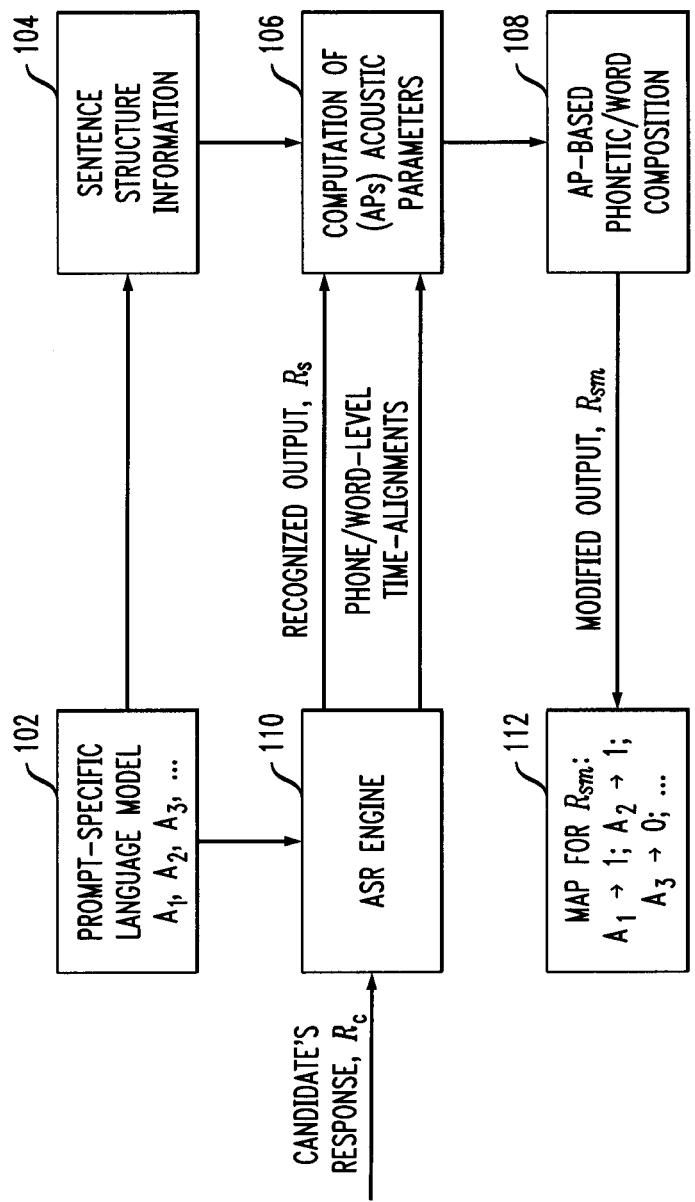
FIG. 1 is a diagram illustrating a spoken grammar evaluation strategy, according to an embodiment of the present invention.

Principles of the invention include combining acoustic-phonetics with automatic speech recognition (ASR) systems to evaluate spoken language skills (for example, spoken English skills). One or more embodiments of the invention automatically evaluate spoken English skills by detecting grammatically incorrect constructs in unconstrained continuous speech. The techniques described herein enable improving the performance of ASR systems by focusing on temporal locations of acoustic dissimilarities and identifying the spoken utterance from a set of acoustically similar options.

As detailed herein, one or more embodiments of the invention include computing acoustic parameters that capture the salient properties of the acoustic-phonetic features of the dissimilarities. Also, the information about the acoustic identity of the speech region obtained from the acoustic parameters can be combined with the acoustic identity obtained from the standard speech recognition system.

In contrast to the disadvantages of existing approaches detailed above, one or more embodiments of the invention use acoustic-phonetic parameters as a post-processing step on the output from a speech recognizer, as well as compute a novel acoustic parameter (referred to herein as "onset coherence") to make a three-way distinction between fricatives, stops and vowels. Additionally, the techniques described herein can change the analysis (that is, computation of acoustic parameters) of the physical speech signal based on the expected phonetic identity, and use time alignment information from the ASR to perform further analysis for improving the recognition accuracy. Further, one or more embodiments of the invention include combining the output of the ASR and the phonetic identity obtained from the acoustic parameters to determine a final output and applying it to spoken grammar evaluation and pronunciation evaluation.

As described herein, one or more embodiments of the invention can be used, for example, to evaluate the pronunciation capabilities of a speaker, detect grammatically incorrect (GI) constructs in spoken utterances, improve the performance of automatic speech recognition (ASR) systems when the underlying language model (LM) includes acoustically similar options, etc. Additionally, the techniques detailed herein can be used in applications that focus on assessing and providing feedback on spoken language skills.

As noted herein, one or more embodiments of the invention hone in on the likely temporal regions of interest and analyze their phonetic composition. The temporal regions of interest for evaluating pronunciation capabilities can be the regions corresponding to a pre-defined set of impact sounds (for example, /zh/, /s/, etc.). The temporal regions of interest for other cases can be, for example, the regions where the acoustic dissimilarities are prominent. The set of acoustic parameters and the analysis strategy used by one or more embodiments of the invention can depend on the expected phonetic composition and the expected acoustic dissimilarities. The techniques described herein can also be implemented for phonetic profiling of people with speech disabilities.

As noted herein, one or more embodiments of the invention include combining the knowledge of acoustic-phonetics with statistical ASR systems to evaluate various aspects of spoken English skills. In an exemplary embodiment of the invention, the techniques can include two stages. In the first stage, a standard ASR system with a domain-specific LM is used to obtain the phone-level and word-level hypothesis, as well as the corresponding time alignments. The analysis in the second stage depends on the application of interest.

By way of example, consider a scenario where the competing options are acoustically similar. The phonetic regions that need disambiguation and the phonetic categories of the contenders can be identified beforehand based on the competing options. For example, if the options are "he kill a snake," "he kills a snake," or "he killed a snake," then the phonetic region that needs disambiguation is the ending of the word "kill(s)(ed)" and the competing categories are sonorant versus fricative versus stop consonant. The actual temporal region in the speech signal corresponding to this phone composition of interest can be estimated from the alignments obtained in an earlier stage. A certain temporal tolerance is allowed to account for potential inaccuracies in the alignments.

Acoustic parameters (APs) that capture the salient characteristics of the various phonetic compositions in contention and can thus identify with certain robustness the phonetic composition actually present are computed from the speech signal. Also, note that the set of APs computed can change based on the phonetic compositions that need to be disambiguated. For example, the APs used to distinguish a fricative from a plosive sound could be different from APs used to distinguish a fricative from another fricative sound.

One or more embodiments of the invention include an AP used to make a three-way distinction among fricatives, stops and vowels. The range of values that these APs assume is also an indication of the level of articulation of the corresponding phones. As such, these APs can also be used to estimate the quality of pronunciation.

One or more embodiments of the invention, therefore, can also be used to evaluate pronunciation capabilities of the speaker. The output from the ASR used in the first stage can identify the temporal locations of some of the impact sounds which are used by human evaluators to evaluate the pronunciation skills of the speaker. The deviation of the APs corresponding to these sounds, computed over the duration of interest, from their target value is a good indication of the deviation of the actual pronounced sound from its ideal pronunciation. Also, for example, such a metric based on the APs is more robust than a similar metric based on standard mel frequency cepstral coefficients (MFCC) feature set because the APs are directly associated with the speech production mechanism. The techniques described herein can also be used for phonetic profiling of people with speech disabilities, which can lead to improved performance of the ASR systems when the input speech is from speakers with speech impairment.

The techniques described herein can also be used to automatically detect GI constructs if the categories of grammatical errors are decided beforehand. For example, assume that one is interested in only detecting grammatical errors related to article-usage. The output of the ASR in the first stage can be used to identify temporal regions where one of the three articles ('a' or 'an' or 'the') was recognized. The analysis in the second stage can then be used to disambiguate which one of the three articles was actually spoken by computing APs that can distinguish between nasals ('n' in 'an') and fricatives ('dh' in 'the'). In the normal scenario, the LM would be biased towards outputting grammatically correct articles.

In contrast to the disadvantages of existing approaches noted herein, one or more embodiments of the invention include detecting GI constructs without the need to modify the LM of the existing ASR system. While disambiguating the output of the ASR, one or more embodiments of the invention focus on the region of ambiguity and compute APs that are direct correlates of the underlying phonetic composition present in the speech signal.

The techniques described herein also lead to improved recognition accuracy, which can result in a direct improvement in the performance of an automatic spoken grammar evaluation module or any spoken language assessment tool. The improvement in recognition will also help the spoken grammar learning tool in providing more accurate feedback to the user.

As noted herein, one or more embodiments of the invention include automatic evaluation of spoken grammar skills. There can be numerous cases in spoken grammar evaluation where the most likely responses from the candidate are acoustically similar. Consider the following examples: (1) For the prompt, "He kill a snake," the most likely responses could include, among others, the following responses: (a) He killed a snake, (b) He kills a snake, and (c) He kill a snake. (2) For the prompt, "Athletic is a popular sport," the most likely responses could include, among others, the following responses: (a) Athletics is a popular sport (b) Athletics is a popular sports. The acoustic differences among the choices in both the cases are localized to short temporal regions ('kill(s)(ed)' in (1) and 'sport(s)' in (2)).

To improve the ASR accuracy among these confusable choices and hence the accuracy of the spoken grammar evaluation, an acoustic-phonetics based approach (as described herein in one or more embodiments of the invention) hones in on the temporal region with acoustic differences and computes acoustic parameters (APs) that will accurately discriminate among the acoustic differences.

FIG. 1 is a diagram illustrating a spoken grammar evaluation strategy, according to an embodiment of the present invention. By way of illustration, FIG. 1 depicts a prompt-specific language model 102, sentence structure information 104, as well as a computation of acoustic parameters (APs) 106. FIG. 1 also depicts an AP-based phonetic and/or word composition 108, an ASR engine 110 and a map for $R_{sm}$ 112. $A_1$, $A_2$, $A_3$ are the sentences used in the LM. Also, $R_c$ is a candidate's response, $R_s$ is the output of the ASR, and $R_{sm}$ is the modified output based on the estimated acoustic composition.

As illustrated in FIG. 1, $R_c$ can be sent to the ASR engine 110, which can, in turn, send $R_s$ and phone and/or word-level time-alignments to the computation of APs 106. Further, $R_{sm}$ can be sent from the AP-based phonetic and/or word composition 108 to the map for $R_{sm}$ 112.

In connection with FIG. 1, a standard ASR system with an appropriately restricted LM can be run on the input utterance. The word level alignments obtained from the standard ASR system along with the information about the sentence structure can be used to compute different APs in the expected temporal region of acoustic differences. To account for any alignment inaccuracies, one or more embodiments of the invention include temporal tolerance while estimating the temporal region of acoustic differences. The APs capture the salient characteristics of the various phonetic compositions in contention and can thus identify with certain robustness the phonetic composition actually present in the speech signal. These APs can also be used to decide the phonetic composition of the temporal region of interest. Further, the choice of APs depends on the phonetic compositions that need to be disambiguated.

As described herein, one or more embodiments of the invention can include refining the output of a standard ASR system to improve its overall performance. The techniques detailed herein include estimating the temporal region and the type of potential confusions based on the output of the ASR system and re-analyzing the physical speech signal using this information for feature computation and re-recognition.

One or more embodiments of the invention also include an AP, referred to herein as onset coherence (OC), which can make a three-way distinction between the onsets of fricatives, stops and sonorants (for example, a three-way distinction among /s/, /d/ and /iy/). The OC AP is motivated by an observation that the beginning of vowels and stop bursts typically has energy onset across all the frequency regions whereas the beginning of fricatives typically lack such an onset across all the frequency regions. Also, the across-frequency energy onsets have a smaller variance in the case of stop bursts as compared to that in vowels, mainly due to the strong formants present in vowels.

Figure 2:
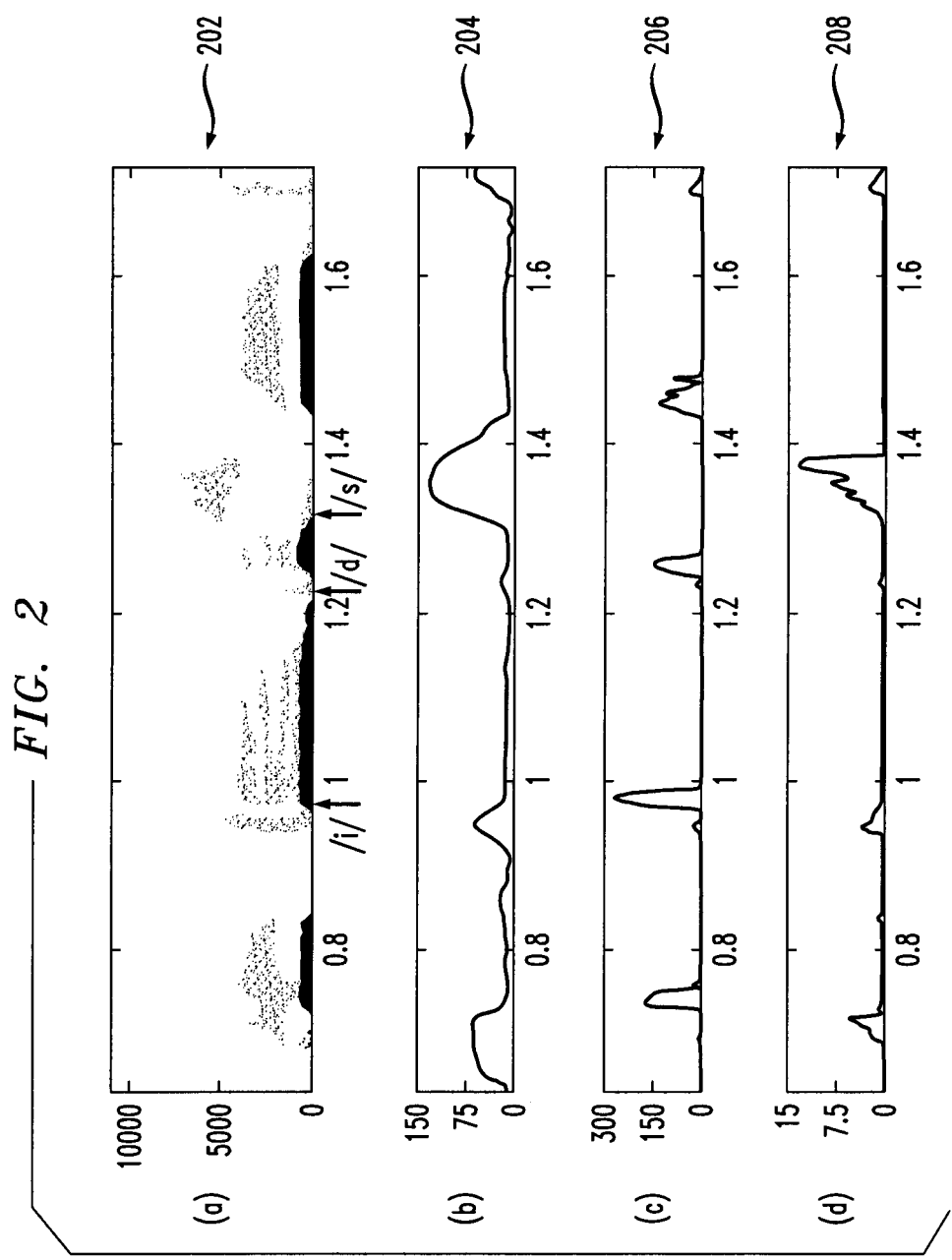
FIG. 2 is a diagram illustrating exemplary spectrograms, according to an embodiment of the present invention.

FIG. 2 is a diagram illustrating exemplary spectrograms, according to an embodiment of the present invention. By way of illustration, FIG. 2 depicts a spectrogram of "he killed a snake" 202, the corresponding zero crossing rate 204, the corresponding onset coherence 206, and the corresponding spectral energy ratio 208. As depicted in FIG. 2, the x-axis represents time in seconds.

The onsets of vowel /i/, stop burst /d/ and fricative /s/ (at 975, 1230 and 1315 milliseconds (ms), respectively) are highlighted in the spectrograms shown in FIG. 2. The utterance shown in the figure is "he killed a snake." Note that energy onset is seen across all of the frequency regions for both the onset of the stop burst and the onset of the vowel, whereas the energy onset is mainly in the high frequency region for the fricative. Also, it is noted that the magnitude of the onsets across different frequency channels varies a lot more in the case of vowel-onsets, mainly due to the strong formants, than in the case of stop-burst-onsets.

As such, the onsets of fricatives can be distinguished from that of vowels and stops by computing a measure of unanimity of onsets across the frequency channels. Vowel-onsets and stop-onsets will typically have a higher value for this measure as compared to the fricative-onsets. The stop-onsets can be distinguished from the vowel-onsets by computing a variance of the magnitude of the onsets across the frequency regions. Stop-onsets will typically have a much lower variance as compared to that of the vowel-onsets.

The computation of the OC AP can be described as follows. The speech signal is split into a set of bandpass frequency channels. The energy difference in the adjacent frames for each of the frequency channels is computed as:

$$\Delta(f, l) = \sum_m |s_f(l*F + m)| - \sum_m |s_f((l-1)*F + m)|$$

where $S_f$ is the speech signal in frequency channel f, l is the frame number, F is the frame rate and m varies over the window length. In one or more embodiments of the invention, the frame rate can be, for example, 10 ms and the window length can be 20 ms. Positive values of $\Delta(f,l)$ indicate energy onsets. Time frames where the energy difference is positive in all the frequency channels are identified. The standard deviation of the magnitude of the energy difference across all the frequency channels for these times frames is the OC. The OC for all the other time frames is set to zero. A value of zero for the OC implies absence of stop burst or vowel whereas a high OC value implies presence of a vowel. The OC is typically low, but non-zero, for stop bursts.

OC can then be computed from $\Delta(f,l)$ as follows:

$$OC_l = \sqrt{\frac{1}{N_f} \sum_{f=1}^{N_f} [\Delta(f, l) - \mu\Delta, l]^2}$$

$$\text{if } \Delta(f, l) > 0$$

$$\forall f = 1 \ldots N_f$$

$$OC_l = 0 \text{ otherwise}$$

where $N_f$ is the total number of frequency channels (44 in this case), $\mu\Delta,l$ is the mean of $\Delta(f, l)$ over all the frequency channels for a given l. Time frames where $\Delta(f, l)$ is positive in all the channels can be identified. The standard deviation of $\Delta(f,l)$ across all the channels for these time frames is the OC for that frame. The OC for all the other time frames is zero. For example, graph 206 in FIG. 2 shows the OC for the speech signal in element 202. Note also that the OC is zero for fricative-onset (1315 ms), is high for vowel-onset (975 ms) and relatively low for stop-onsets (950 ms and 1230 ms).

One or more embodiments of the invention also use APs such as, for example, the zero crossing rate (ZCR) and the spectral energy ratio. ZCR is defined as the number of time-domain zero-crossings of the signal within a predefined region. ZCR is an acoustic correlates used mainly to detect fricatives. Also, ZCR is typically high in the fricative regions. Spectral energy ratio, defined as the ratio of the energy in the high frequency region to the energy in the low frequency region, is typically high for strident fricatives, low for vocalic sounds and in-between for the rest of the non-sonorants.

The thresholds for these parameters can be trained on a subset of real-life recordings, and one or more embodiments of the invention automatically adapt the thresholds for a given situation. For example, consider a situation where the task is to decide if the user's response contained 'sport' or 'sports.' Because it is known that the first part of the word 'sport(s)' has the strident fricative /s/, the region aligned to the recognized word 'sport' is split into two equal parts. The values of the APs in the first part of the word are used to tune the threshold for the detection of the fricative /s/ in the second part.

As also described herein, spectral energy ratio (SER) is a parameter based on the ratio of the energy in high frequency to the energy in low frequency and can distinguish vocalic regions from non-vocalic regions. This ratio is very low for vocalic sounds, very high for strident fricatives in-between for the rest of the non-sonorants. In one or more embodiments of the invention, the SER can be computed, for example, every 5 ms as the ratio of the energy in [2000-Fs/2] Hz and [0-2000] Hz computed over a windowed signal of 20 ms. Graph 208 in FIG. 2 shows the SER for the utterance shown in element 202. Note that the SER is the highest in the fricative region (around 1350 ms).

Figure 3:
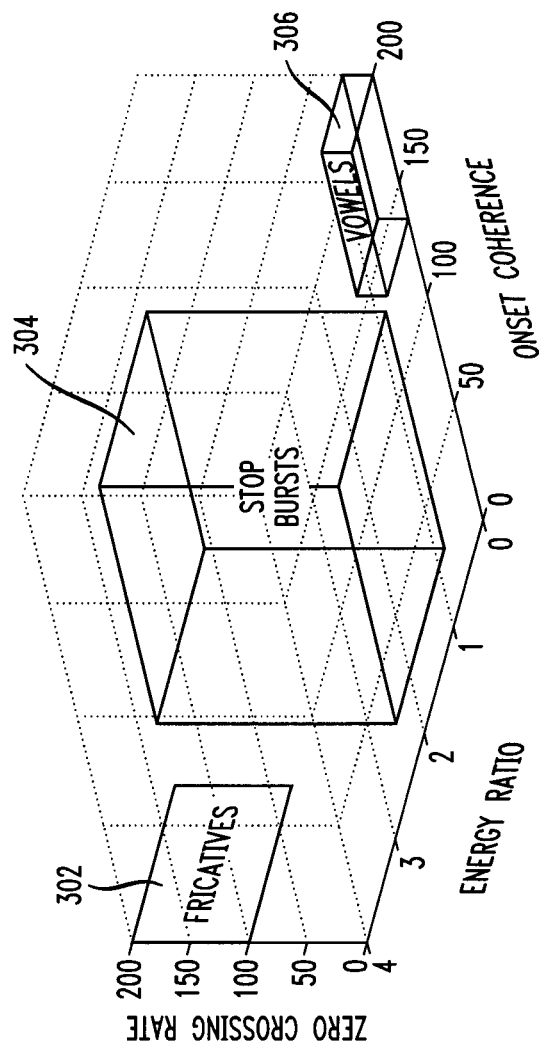
FIG. 3 is a diagram illustrating estimates of region bounds of different acoustic parameters for different phonetic classes, according to an embodiment of the present invention.

FIG. 3 is a diagram illustrating estimates of region bounds of different acoustic parameters for different phonetic classes, according to an embodiment of the present invention. By way of illustration, FIG. 3 depicts estimates of the bounds on the regions occupied by fricatives 302, stop bursts 304 and vowels 306 in the three-dimensional space of the acoustic parameters of zero crossing rate, onset coherence and energy ratio. The bounds depicted in FIG. 3 are based on the thresholds learned from training data.

As noted, FIG. 3 illustrates the estimated bounds on the regions spanned by fricatives, stop bursts and vowels in the space of the three parameters. Based on the physical significance and the computational details of these parameters, it can be estimated that vowels mainly occupy the high-OC (>130), low SER (<0.75) and low ZCR (<25) region, stops mainly occupy the mid-OC (>25 and <130), mid SER (>0.75 and <2.5) region with no particular bias in the ZCR dimension, and fricatives mainly occupy the high ZCR (>100), high SER (>2.5) region and zero OC. The thresholds are learned from training data.

In one or more embodiments of the invention, an algorithm to combine the phonetic information obtained from the APs with the recognition output of the ASR system uses the information about the structure of the sentence and its constituent words. For a given sentence, the list of words that are prone to grammatical mistakes and their corresponding most common errors are maintained (for example, kill/killed/kills, sport/sports, athletic/athletics, etc.). The physical signal corresponding to these words can be located using the word-level alignments computed by the ASR system. A certain temporal tolerance can be allowed to account for possible alignment errors made by the ASR. APs that can assist in determining which variant of the word was spoken can be computed over this temporal region of interest. Based on the values of these APs, the ASR output is either retained or changed appropriately.

For example, consider the prompt "athletics are a popular sport" to which the candidate responded as "athletics are a popular sports." Further, assume that the ASR decoded the response as "athletics are a popular sport." The task is to decide whether or not the candidate's response contained 'sport' or 'sports,' and 'athletic' or 'athletics.' The temporal location of the portion of the speech signal aligned to the recognized word 'sport' can be obtained from the ASR output. The speech signal of interest is broken into two equal parts. The OC, ZCR and SER APs which can detect the presence of a fricative are computed for the second part. The thresholds learned from the training data can be used to make a decision about whether the fricative /s/ is present in the second part. Similarly, these APs are computed in the temporal region corresponding to the word 'athletics' to decide whether the response contained 'athletic' or 'athletics.'

The phonetic composition of the word and/or sentence can also be used to improve performance. For example, in the situation described above, it is known that the first part of the word 'sport(s)' has the strident fricative /s/. OC, ZCR and SER APs, which can detect the presence of a fricative, can be computed separately for the first half of the aligned speech signal. The behavior of these APs in this region (where a /s/ fricative is present) can be used to tune the decision thresholds used for the detection of /s/ in the second half.

A similar combination of the output of a standard ASR system and an AP-based estimated phonetic composition can be used to refine the final recognized output when the competing options are acoustically similar. As described herein, one or more embodiments of the invention lead to an improvement in the overall recognition accuracy and, in turn, improve the performance of the spoken grammar evaluation module of spoken language evaluation tools. The improvement in the recognition accuracy can also improve the quality of the feedback provided by a spoken grammar learning tool.

For the task of detecting GI constructs, the set of acoustically similar options can be created based on a set of rules. For example, assume that one is interested in only detecting grammatical errors related to article-usage. The output of the ASR in the first stage can be used to identify temporal regions where one of the three articles ('a' or 'an' or 'the') was recognized. The analysis in the second stage can then be used to disambiguate which one of the three articles was actually spoken by computing APs that can distinguish between nasals ('n' in 'an') and fricatives ('dh' in 'the'). Post-processing based on the N-gram probabilities from the statistical LM can identify whether the sentence was grammatically correct or incorrect.

The ASR system used for recognition can be a context-dependent Hidden Markov Model (HMM) system (for example, a system that is trained on more than 500 English speakers with an overall speech data of about 130 hours). The front-end includes 60-dimensional feature vectors obtained by combining nine consecutive frames of 24-dimensional MFCC and applying linear discriminant analysis on the combined frame.

The five thresholds depicted in FIG. 3 were trained, by way of example, based on the temporal regions with maximum acoustic dissimilarity using 2448 utterances and their corresponding word alignments obtained from the ASR system. In one or more embodiments of the invention, evaluations can be conducted, for example, only on those prompts where the different sentences in the corresponding prompt-specific LMs were acoustically similar and the dissimilarities were localized to narrow temporal regions.

As depicted below, Table 1 compares the speech recognition accuracy and the spoken grammar evaluation accuracy when only the ASR system was used and when the acoustic-phonetic information was combined with the output of the ASR system. Speech recognition accuracy is defined as the percentage of total recordings evaluated where the output of the ASR system and the candidate's recording matched exactly. The spoken grammar evaluation accuracy is defined as the percentage of total recordings evaluated where the automatically-generated grammar score of 0 or 1 matched with the human-assigned score. Note that the recognition accuracy can be computed on a subset of the test data where the candidate's recording was present among the sentences in the restricted LM while the grammar accuracy was computed on the entire test data, which explains the difference between recognition accuracy and the grammar accuracy.

TABLE 1

Speech recognition accuracy and spoken grammar evaluation accuracy.

|  | only ASR | ASR and acoustic-phonetics |
|---|---|---|
| Recog. acc. | 88.4% | 94.2% |
| Grammar acc. | 74.4% | 82.6% |

As Table 1 shows, one or more embodiments of the invention improve the recognition accuracy by 5.8% and the spoken grammar evaluation accuracy by 8.2%. The combination can also lead to more accurate feedback to the user. For example, consider the prompt "both the dogs is barking," to which the candidate responds as "both the dog is barking." The ASR system might recognize this as "both the dogs is barking" and the feedback provided could be: replace 'is' with 'are'. For example, combining the acoustic information can change the recognized output to "both the dog is barking" in many instances. In such cases, the feedback can include: replace 'is' with 'are' and replace 'dog' with 'dogs'.

One or more embodiments of the invention can also be used to detect grammatically incorrect constructs (GICs) in free speech. For example, the ASR systems can give much higher weight to the predictions from the statistical LM as compared to the predictions based on the acoustic models. The LMs are typically trained on grammatically correct data. As a result, it is unlikely that ASR will detect GICs. Moreover, the GICs very often, differ from the corresponding grammatically correct constructs only in short temporal regions (for example, "she have" versus "she has," "this is book" versus "this is a book," and so on). The techniques described herein can be used to automatically detect GICs if the categories of grammatical errors are decided before-hand.

Figure 4:
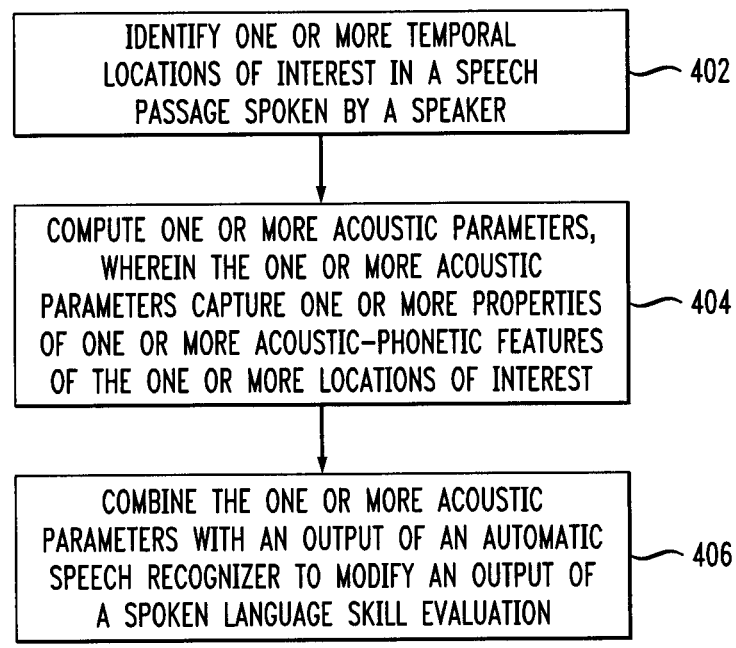
FIG. 4 is a flow diagram illustrating techniques for evaluating one or more spoken language skills of a speaker, according to an embodiment of the present invention.

FIG. 4 is a flow diagram illustrating techniques for evaluating one or more spoken language skills of a speaker, according to an embodiment of the present invention. The spoken skills can include, for example, grammatical skill of the speaker, pronunciation skill of the speaker, etc. Step 402 includes identifying one or more temporal locations of interest in a speech passage spoken by a speaker. Identifying temporal locations of interest in a speech passage spoken by a speaker can include locating one or more phones of interest (or impact phones). Additionally, identifying temporal locations of interest in a speech passage spoken by a speaker can include locating acoustic dissimilarities between a sample speech passage and the speech passage spoken by the speaker. Further, identifying temporal locations of interest in a speech passage can include identifying a spoken utterance from a set of one or more acoustically similar options.

The temporal locations of interest in a speech passage spoken by a speaker can include, for example, one or more regions corresponding to a pre-defined set of impact sounds, as well as one or more regions where acoustic dissimilarities are prominent.

Step 404 includes computing one or more acoustic parameters, wherein the one or more acoustic parameters capture one or more properties of one or more acoustic-phonetic features of the one or more locations of interest. Computing acoustic parameters can include computing an acoustic parameter to determine spectral differences between the onset of a fricative, a vowel and a stop burst.

Step 406 includes combining the one or more acoustic parameters with an output of an automatic speech recognizer to modify an output of a spoken language skill evaluation.

Combining the acoustic parameters with an output of an automatic speech recognizer can include combining information about an acoustic identity of a speech region obtained from the acoustic parameters with an acoustic identity obtained from a speech recognition system. The result of the combination can include potentially changing the final acoustic identity of the spoken utterance in order to improve overall automatic speech recognition accuracy, improve spoken grammar evaluation accuracy and improve pronunciation evaluation accuracy.

The techniques depicted in FIG. 4 can also include using time alignment information from an automatic speech recognition system to improve recognition accuracy, as well as allowing certain bi-directional temporal tolerance to the time alignment information from an automatic speech recognition system. One or more embodiments of the invention can also include phonetic profiling of a speaker with a speech disability.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 5:
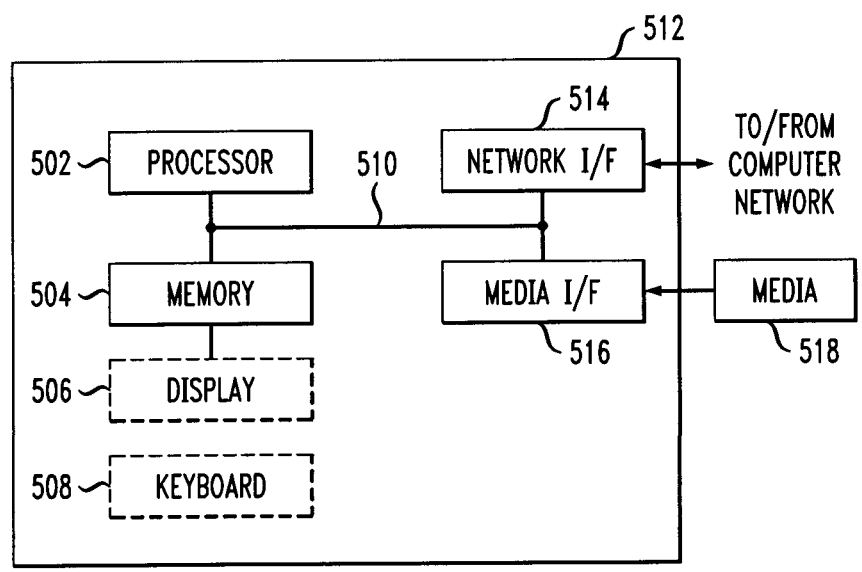
FIG. 5 is a system diagram of an exemplary computer system on which at least one embodiment of the present invention can be implemented.

At present, it is believed that the preferred implementation will make substantial use of software running on a general-purpose computer or workstation. With reference to FIG. 5, such an implementation might employ, for example, a processor 502, a memory 504, and an input and/or output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 502, memory 504, and input and/or output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 504), magnetic tape, a removable computer diskette (for example, media 518), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, combining the output of the ASR and the phonetic identity obtained from the acoustic parameters to determine the final output and applying it to a spoken grammar evaluation.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for evaluating one or more spoken language skills of a speaker, comprising the steps of:
    identifying one or more temporal locations of interest in an output of a spoken language skill evaluation performed on a speech passage spoken by a speaker;
    computing one or more acoustic parameters to capture one or more properties of one or more acoustic-phonetic features of the one or more locations of interest, said computing comprising determining one or more spectral differences between the onset of a fricative, a vowel and a stop burst by computing a ratio of energy in a high frequency region of the speech passage to energy in a low frequency region of the speech passage over a pre-determined time period via $$\sqrt{\frac{1}{N_f} \sum_{f=1}^{N_f} [\Delta(f, l) - \mu\Delta, l]^2},$$

wherein f is a given frequency channel, $N_f$ is a total number of frequency channels, l is a given frame number, $\Delta(f, l)$ is an energy difference in adjacent frames for the given frequency channel f, and $\mu\Delta,l$ is the mean of $\Delta(f, l)$ over all frequency channels for the given l; and
    combining the one or more acoustic parameters with the output of an automatic speech recognizer to generate a modified output of the spoken language skill evaluation.

2. The method of claim 1, wherein identifying one or more temporal locations of interest comprises locating one or more phones of interest.

3. The method of claim 1, wherein identifying one or more temporal locations of interest comprises locating one or more acoustic dissimilarities between a sample speech passage and the speech passage spoken by the speaker.

4. The method of claim 1, wherein identifying one or more temporal locations of interest comprises identifying a spoken utterance from a set of one or more acoustically similar options.

5. The method of claim 1, wherein combining the one or more acoustic parameters with the output of an automatic speech recognizer comprises combining information about an acoustic identity of a speech region obtained from the one or more acoustic parameters with an acoustic identity obtained from a speech recognition system.

6. The method of claim 1, wherein the one or more spoken language skills of a speaker comprise at least one of grammatical skill of the speaker and pronunciation skill of the speaker.

7. The method of claim 1, further comprising using time alignment information from an automatic speech recognition system to improve recognition accuracy.

8. The method of claim 7, further comprising allowing certain bi-directional temporal tolerance to the time alignment information from an automatic speech recognition system.

9. The method of claim 1, wherein the one or more temporal locations of interest comprises one or more regions corresponding to a pre-defined set of one or more impact sounds.

10. The method of claim 1, wherein the one or more temporal locations of interest comprises one or more regions where one or more acoustic dissimilarities are prominent.

11. The method of claim 1, further comprising phonetic profiling of a speaker with a speech disability.

12. A computer program product comprising a tangible computer readable storage memory device having computer readable program code for evaluating one or more spoken language skills of a speaker, said computer program product including:
    computer readable program code for identifying one or more temporal locations of interest in an output of a spoken language skill evaluation performed on a speech passage spoken by a speaker;

computer readable program code for computing one or more acoustic parameters to capture one or more properties of one or more acoustic-phonetic features of the one or more locations of interest, said computing comprising determining one or more spectral differences between the onset of a fricative, a vowel and a stop burst by computing a ratio of energy in a high frequency region of the speech passage to energy in a low frequency region of the speech passage over a predetermined time period via $$\sqrt{\frac{1}{N_f}\sum_{f=1}^{N_f}[\Delta(f,l)-\mu\Delta,l]^2},$$

wherein f is a given frequency channel, $N_f$ is a total number of frequency channels, l is a given frame number, $\Delta(f, l)$ is an energy difference in adjacent frames for the given frequency channel f, and $\mu\Delta,l$ is the mean of $\Delta (f, l)$ over all frequency channels for the given l; and computer readable program code for combining the one or more acoustic parameters with the output of an automatic speech recognizer to generate a modified output of the spoken language skill evaluation.

13. The computer program product of claim 12, wherein the computer readable program code for identifying one or more temporal locations of interest comprises computer readable program code for locating one or more phones of interest.

14. The computer program product of claim 12, wherein the computer readable program code for identifying one or more temporal locations of interest comprises computer readable program code for locating one or more acoustic dissimilarities between a sample speech passage and the speech passage spoken by the speaker.

15. The computer program product of claim 12, wherein the one or more spoken language skills of a speaker comprise at least one of grammatical skill of the speaker and pronunciation skill of the speaker.

16. The computer program product of claim 12, further comprising computer readable program code for using time alignment information from an automatic speech recognition system to improve recognition accuracy.

17. A system for evaluating one or more spoken language skills of a speaker, comprising:
a memory; and
at least one processor coupled to said memory and operative to:
identify one or more temporal locations of interest in an output of a spoken language skill evaluation performed on a speech passage spoken by a speaker;
compute one or more acoustic parameters to capture one or more properties of one or more acoustic-phonetic features of the one or more locations of interest, said computing comprising determining one or more spectral differences between the onset of a fricative, a vowel and a stop burst by computing a ratio of energy in a high frequency region of the speech passage to energy in a low frequency region of the speech passage over a predetermined time period via $$\sqrt{\frac{1}{N_f}\sum_{f=1}^{N_f}[\Delta(f,l)-\mu\Delta,l]^2},$$

wherein f is a given frequency channel, $N_f$ is a total number of frequency channels, l is a given frame number, $\Delta(f, l)$ is an energy difference in adjacent frames for the given frequency channel f, and is the mean of $\Delta (f, l)$ over all frequency channels for the given l; and combine the one or more acoustic parameters with the output of an automatic speech recognizer to generate a modified output of the spoken language skill evaluation.

18. The system of claim 17, wherein in identifying one or more temporal locations of interest the at least one processor coupled to said memory is further operative to locate one or more phones of interest.

19. The system of claim 17, wherein in identifying one or more temporal locations of interest the at least one processor coupled to said memory is further operative to locate one or more acoustic dissimilarities between a sample speech passage and the speech passage spoken by the speaker.

20. The system of claim 17, wherein the one or more spoken language skills of a speaker comprise at least one of grammatical skill of the speaker and pronunciation skill of the speaker.

21. The system of claim 17, wherein the at least one processor coupled to said memory is further operative to use time alignment information from an automatic speech recognition system to improve recognition accuracy.

22. An apparatus for evaluating one or more spoken language skills of a speaker, said apparatus comprising:
means for identifying one or more temporal locations of interest in an output of a spoken language skill evaluation performed on a speech passage spoken by a speaker;
means for computing one or more acoustic parameters to capture one or more properties of one or more acoustic-phonetic features of the one or more locations of interest, said computing comprising determining one or more spectral differences between the onset of a fricative, a vowel and a stop burst by computing a ratio of energy in a high frequency region of the speech passage to energy in a low frequency region of the speech passage over a predetermined time period via $$\sqrt{\frac{1}{N_f}\sum_{f=1}^{N_f}[\Delta(f,l)-\mu\Delta,l]^2},$$

wherein f is a given frequency channel, $N_f$ is a total number of frequency channels, l is a given frame number, $\Delta(f, l)$ is an energy difference in adjacent frames for the given frequency channel f, and $\mu\Delta,l$ is the mean of $\Delta (f, l)$ over all frequency channels for the given l; and means for combining the one or more acoustic parameters with the output of an automatic speech recognizer to generate a modified output of the spoken language skill evaluation.

* * * * *